(12) United States Patent
Bloedorn

(10) Patent No.: US 7,721,676 B2
(45) Date of Patent: May 25, 2010

(54) BIRD FEEDER

(75) Inventor: Daniel A. Bloedorn, Chilton, WI (US)

(73) Assignee: Backyard Nature Products, Inc., Chilton, WI (US)

( * ) Notice: Subject to any disclaimer, the term of this patent is extended or adjusted under 35 U.S.C. 154(b) by 299 days.

(21) Appl. No.: 11/331,939

(22) Filed: Jan. 13, 2006

(65) Prior Publication Data

US 2007/0163506 A1    Jul. 19, 2007

(51) Int. Cl.
*A01K 39/01* (2006.01)
(52) U.S. Cl. .................................... 119/57.8
(58) Field of Classification Search ............ 119/52.2, 119/52.3, 57.8, 57.9
See application file for complete search history.

(56) References Cited

U.S. PATENT DOCUMENTS

| | | | |
|---|---|---|---|
| 1,107,881 A * | 8/1914 | Berntsen et al. ............ 403/247 |
| 3,568,641 A | 3/1971 | Kilham | |
| D231,369 S | 4/1974 | Kilham | |
| D245,715 S | 9/1977 | Eldridge, Jr. | |
| D262,917 S | 2/1982 | Kilham | |
| 4,318,364 A | 3/1982 | Bescherer | |
| 4,355,597 A | 10/1982 | Blasbalg | |
| 4,356,793 A | 11/1982 | Blasbalg | |
| 4,434,745 A | 3/1984 | Perkins et al. | |
| 4,436,187 A * | 3/1984 | Bolenbaugh et al. ..... 188/73.45 |
| D282,019 S | 12/1985 | Kilham | |
| 4,829,934 A | 5/1989 | Blasbalg | |
| 4,996,947 A | 3/1991 | Petrides | |
| D320,097 S | 9/1991 | Vajtay | |
| 5,062,388 A | 11/1991 | Kilham | |
| 5,105,765 A | 4/1992 | Loken | |
| 5,123,380 A | 6/1992 | Edwards | |
| 5,215,039 A | 6/1993 | Bescherer | |
| D349,982 S | 8/1994 | Hardison | |
| D359,821 S | 6/1995 | Liethen | |
| 5,452,682 A | 9/1995 | Bescherer et al. | |
| D367,134 S | 2/1996 | Bescherer | |
| 5,642,689 A | 7/1997 | Harvey | |
| 5,671,696 A | 9/1997 | Liethen | |
| D385,067 S | 10/1997 | Whittles | |
| 5,678,507 A | 10/1997 | Kassner | |
| 5,701,842 A | 12/1997 | Whittles | |
| 5,826,540 A | 10/1998 | Bridges | |
| 6,024,049 A | 2/2000 | Price | |
| 6,213,054 B1 * | 4/2001 | Marshall ................ 119/57.8 |

(Continued)

*Primary Examiner*—Trinh T Nguyen
*Assistant Examiner*—Joseph W Sanderson
(74) *Attorney, Agent, or Firm*—Whyte Hirschboeck Dudek SC

(57) ABSTRACT

A bird feeder is provided having a pivotal wire bail to allow the top cap to be lifted and rotated away from the top opening for easy filling of bird food without unnecessary spillage. Additionally, the invention provides for a detachable base cap having a spring clip retention feature that holds the base cap in place when in use but provides for its intentional removal when desired for cleaning purposes. The feeder has an optional detachable tray where birds can rest while feeding. The invention also provides multiple embodiments, having a body constructed of metal or plastic alternatives. The metal bodies, preferably tubular in shape, are each formed of perforated or expanded metal, having holes therethrough, the size of the holes being dependent upon the size of the seed or other feed selected. The plastic tube feeder provides feeder ports for seed access, as well as rotatable perches for the birds to rest on while feeding.

3 Claims, 8 Drawing Sheets

U.S. PATENT DOCUMENTS

| | | |
|---|---|---|
| 6,253,707 B1 | 7/2001 | Cote |
| 6,276,298 B1 | 8/2001 | Welsh |
| 6,332,427 B1 | 12/2001 | Coulson |
| 6,453,843 B2 | 9/2002 | Bescherer |
| 6,543,383 B1 | 4/2003 | Cote |
| 6,564,745 B1 | 5/2003 | Bloedorn |
| D477,117 S | 7/2003 | Stokes et al. |
| 6,957,626 B2 * | 10/2005 | Ela et al. ............ 119/57.9 |
| 2005/0145182 A1 * | 7/2005 | Marshall ............ 119/57.8 |
| 2005/0211177 A1 * | 9/2005 | Bescherer ............ 119/57.8 |

* cited by examiner

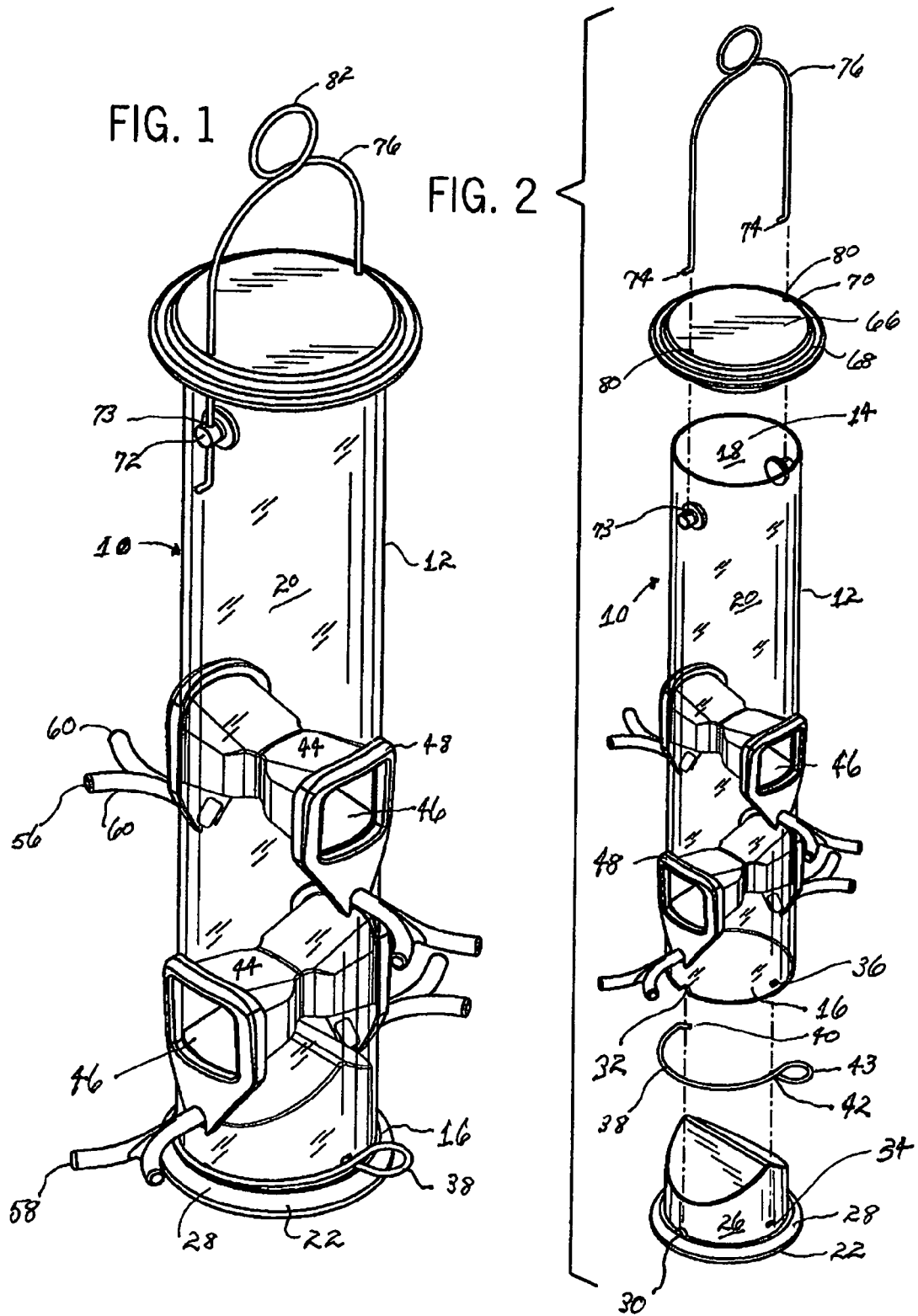

FIG. 14
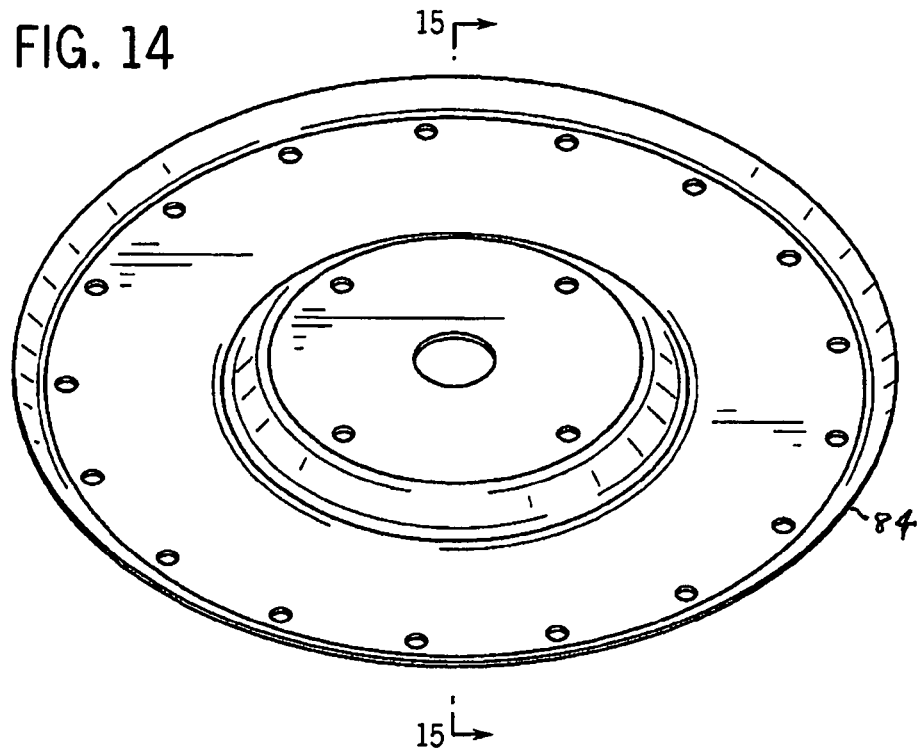
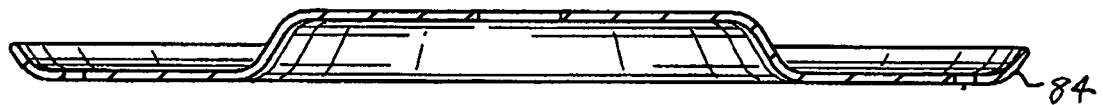
FIG. 15

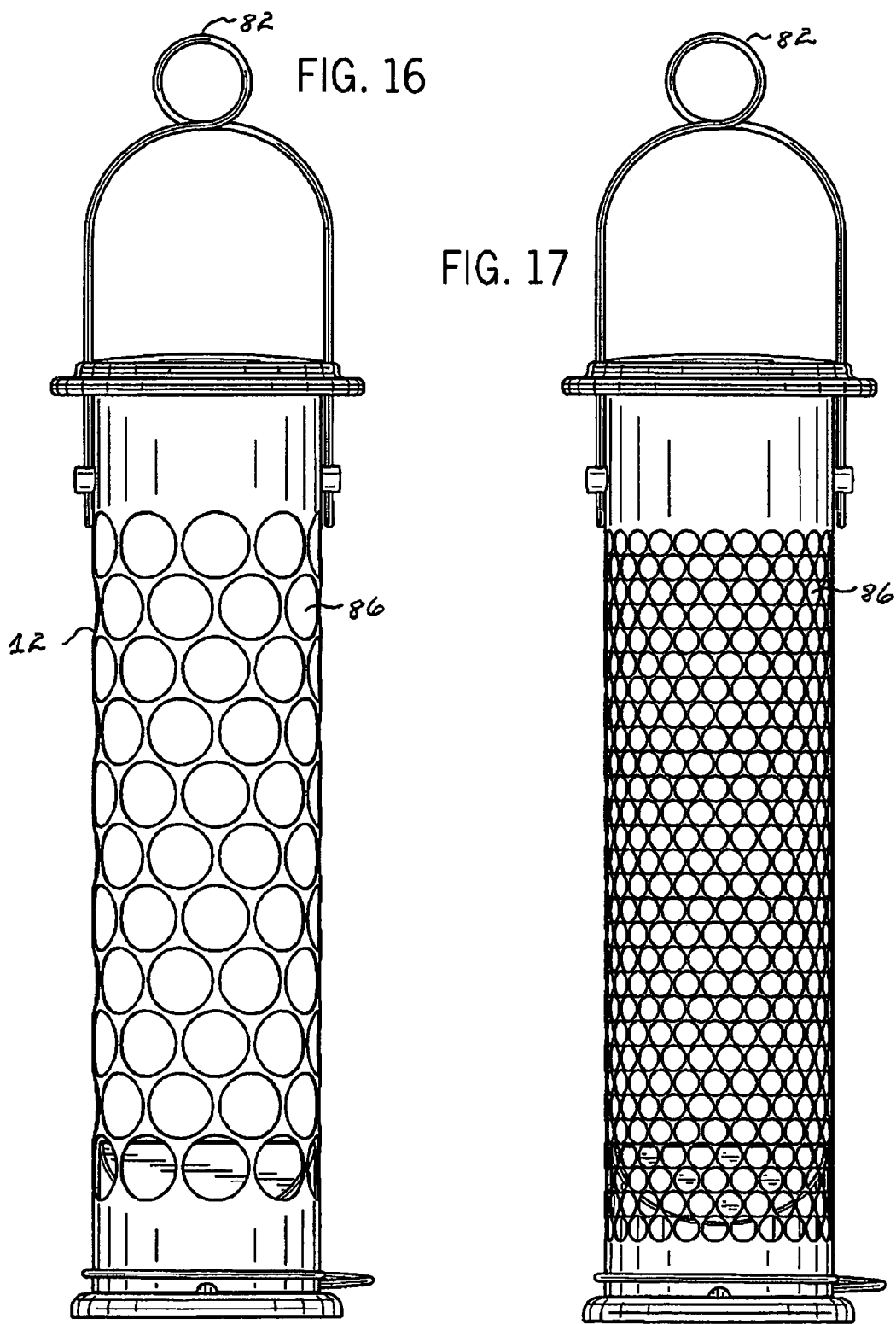

BIRD FEEDER

FIELD OF THE INVENTION

The invention relates to bird feeders, and more specifically to a bird feeder having a top cap that may be rotated off of, and away from, the body for filling and cleaning purposes, but remain attached to the feeder. This is accomplished through the use of a rotatable wire bail attached to the body by bail retaining pins. The invention also has a readily removable base cap that can be detached and easily reattached for cleaning purposes without the use of tools. The feeder has various alternative embodiments, including a body manufactured of plastic with rotatable perches and embodiments where the body is made of perforated metal with various feed hole sizes. The feeder may also have a tray attachment.

BACKGROUND OF THE INVENTION

There are various sizes and configurations of bird feeders that are used to provide wild birds with a ready supply of food, mainly in the form of seed. Many feeders provide a tray and/or perch on which the bird may rest as it feeds. Most tubular shaped feeders are designed to hang from tree limbs or poles in a manner that allows access from all sides so that multiple birds may feed at once from the same feeder. Hooks or wire bails are commonly used in the industry to hang the feeder from a tree limb or pole.

One problem encountered is that feeders are hung outdoors and the feeder and its contents are exposed to the elements. If the seed gets wet due to exposure to precipitation, it can be subject to decay and the growth of mold or mildew, making it undesirable for feeding purposes. Under such circumstances, the body of the feeder needs to be thoroughly cleaned and refilled with undamaged seed. Furthermore, the body needs to be accessed on a regular basis for refilling as it is emptied of its contents by the feeding birds.

Because of the constant exposure to precipitation and sunlight, the body of the feeder in which the seed is contained needs to be covered, which is also helpful to prevent excess spillage. Generally, the opening at the top of tubular feeders is relatively small compared to the length of the tubular body. The lid covering of most feeders of this type must be removed, or at least partially removed, in order to fill the feeder. Because of the relatively small top opening, the body must be filled carefully to avoid wasteful spilling of seed.

Consequently, it is important to have a feeder that provides easy access to the body, both for filling and cleaning purposes. Although most feeders may open to some extent on top for filling purposes, it is quite difficult with a long tubular feeder to thoroughly clean the feeder without having a removable top and bottom so that the entire tube may be accessed and cleaned.

Therefore, it is desirable to provide a bird feeder that provides complete and clear access to the interior of the feeder for filling and cleaning purposes. Toward this objective, it is desirable to provide a feeder without any obstructions inside the feeder near the top opening thereto. It is also desirable to provide a feeder body that is durable and will withstand potential damage caused by exposure to the elements. It is another desirable objective to provide a feeder having a top cap that is removably attached to the body. It is also desirable to provide a feeder that has an easily removable bottom cap that can be removed and reattached without the use of tools for cleaning purposes. It is also desirable to have perches that can rotate to provide different configurations.

SUMMARY OF THE INVENTION

It is an object of the present invention to provide a bird feeder having an interior which can be fully accessed for efficient filling and cleaning purposes.

It is an object of the present invention to provide a feeder that is easier and less expensive to manufacture.

It is an object of the invention to provide a feeder that can be modified to accommodate different feed.

It is a further object of the invention to provide a feeder that is durable when exposed to the elements.

It is also an object of the invention to provide a feeder with a top cap that is removably attached to the feeder opening for cleaning and filling purposes.

It is a further object of the invention to provide a feeder having a bottom cap that can be easily removed and reattached without the use of tools.

It is a further object of the invention to provide a feeder having rotatable perches.

Various other features, objects and advantages of the present invention will become apparent to one of ordinary skill in the art from the following detailed description taken together with the drawings.

BRIEF DESCRIPTION OF THE DRAWINGS

Preferred embodiments of the invention are described below with reference to the following drawings, which are provided for illustrative purposes only. The drawings illustrate a best mode presently contemplated for carrying out the invention.

In the drawings:

FIG. 1 is a perspective view of a bird feeder having a body with four feeding stations and perches;

FIG. 2 is an exploded perspective view of a bird feeder having four feeding stations and perches;

FIG. 14 is a perspective view of the tray shown in FIG. 10;

FIG. 15 is a cross-sectional view of the tray shown in FIG. 14 on the line 15-15;

FIG. 16 is an elevational view of a bird feeder having a body of perforated metal with large holes for seed access;

FIG. 17 is an elevational view of a bird feeder having a body of perforated metal with medium-sized holes for seed access.

DETAILED DESCRIPTION OF THE PREFERRED EMBODIMENT

Figure 3:
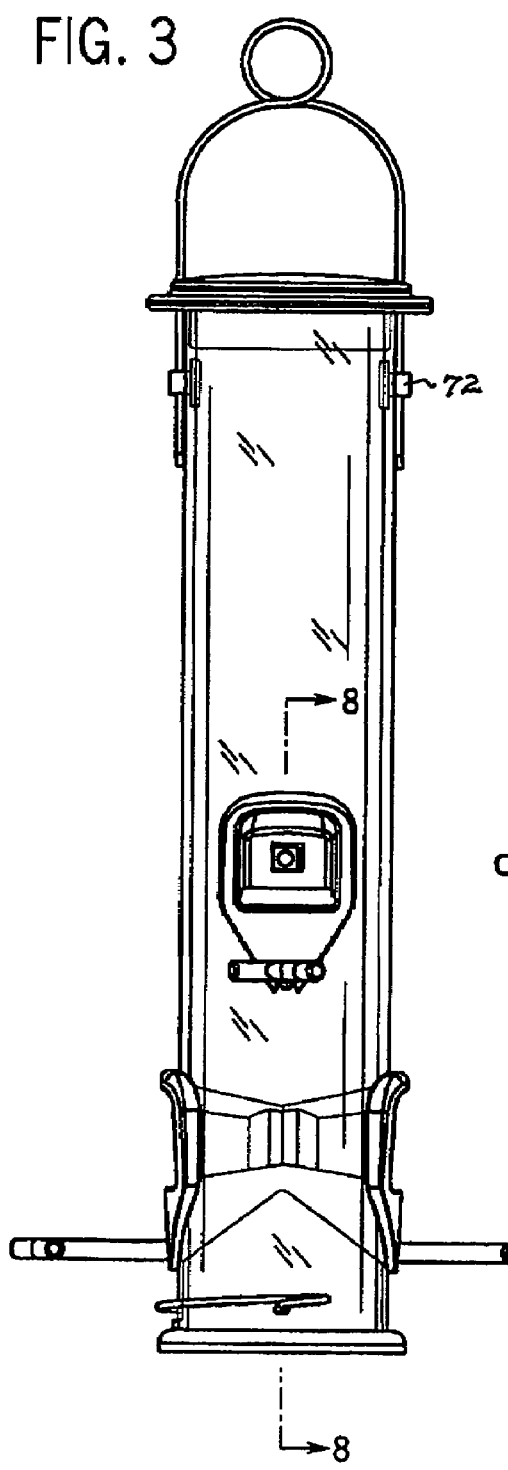
FIG. 3 is a front elevational view of a bird feeder having four feeding stations and perches.

In the following detailed description, references are made to the accompanying drawings which form a part of this application, and in which is shown by way of illustration specific embodiments in which the invention can be practiced. These embodiments are described in sufficient detail to enable those skilled in the art to practice the invention, and it is to be understood that other embodiments can be utilized and that various changes can be made without departing from the spirit and scope of the present invention. Moreover, in the detailed description, like numerals are employed to designate like parts throughout the disclosure.

Referring now to the drawings, FIG. 1 illustrates a preferred embodiment of the present invention. The elements of the feeder shown in FIG. 1 and their relationship to each other are even more apparent in the exploded view of the feeder as shown in FIG. 2. In a preferred embodiment, the body 12 of the feeder 10 is generally tubular in shape. The body 12, as shown in FIGS. 1 and 2, is manufactured of clear or colored plastic material that is substantial enough to withstand exposure to sun, precipitation and changes in temperature, such as polycarbonate. However, as later discussed, the body 12 could alternatively be comprised of other material including perforated or expanded metal. Preferably, the body 12, as shown in FIG. 2, is open at both a top end 14 and a bottom end 16, having an interior 18 and an exterior 20.

At the bottom end 16 is a base cap 22 that is removable from, but securely fastened to, the feeder 10. The base cap 22 is preferably manufactured of die cast metal but can be made of various materials, including plastic. As shown in FIG. 2, the base cap 22 is generally tubular in shape and designed to fit inside the body 12. The upper portion 26 of the base cap 22 is configured to fit easily, but snuggly inside the interior 18 of the body 12. The rim portion 28 is of greater diameter than the body 12, forming a lip 29. In this manner, the upper portion 26 of the base cap 22 fits securely inside the body 12. When the base cap 22 is fitted inside the body 12, the body 12 rests on the lip 29 of the rim portion 28 of the base cap 22 as shown in FIG. 1.

Figure 4:
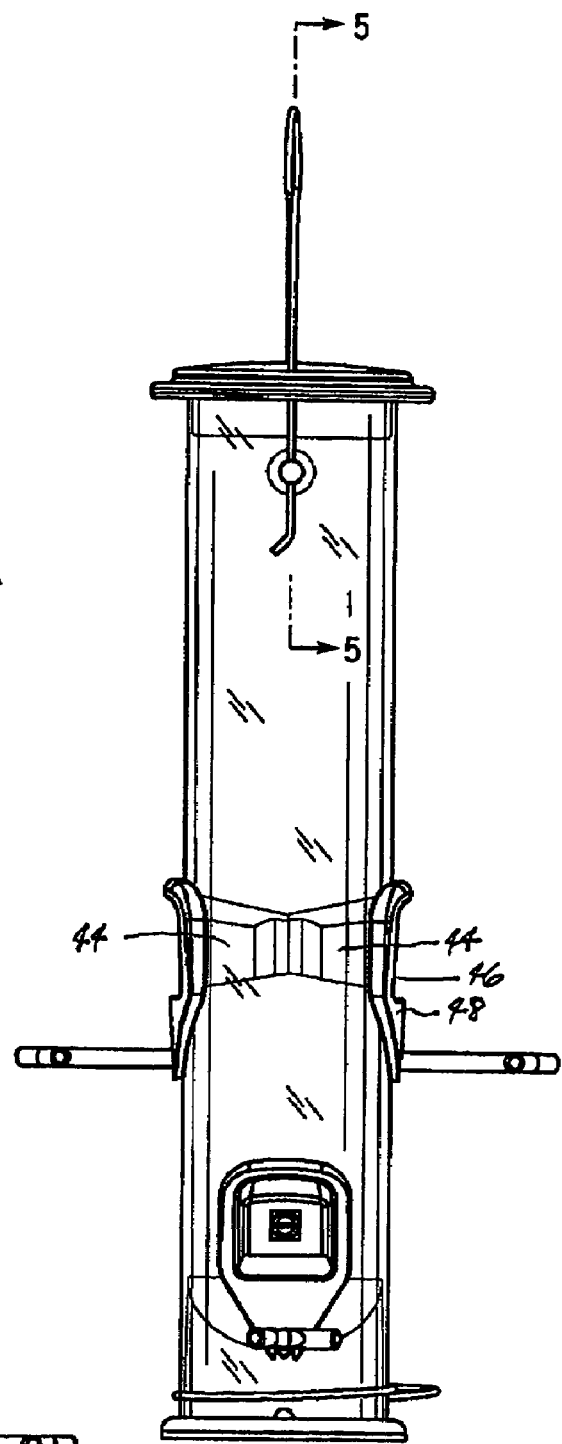
FIG. 4 is a right side elevational view thereof.

In a preferred embodiment, as shown in FIGS. 2 and 4, the base cap 22 has a notch 30 forming an integral part of the upper portion 26 and extending above the lip 29 of the rim portion 28. The notch 30 is preferably of the same shape as a cutout notch 32 (shown in FIG. 2) on the bottom end 16 of the body 12, but slightly smaller, so that it can be aligned with the cutout notch 32 when the body 12 is seated on the base cap 22. The base cap 22 also has two base holes 34 therein, one directly opposite the other, located on the upper portion 26, slightly above the lip 29 of the rim portion 28 of the base cap 22 on which the body 12 rests when the upper portion 26 of the base cap 22 is inserted therein (see FIG. 9). The body 12 likewise has two body holes 36 therein, one directly opposite the other, situated the same distance from the bottom end 16 of the body 12 as the base holes 34 are from the lip 29 of the rim portion 28 and the same distance in each direction from the cutout notch 32 as the base holes 34 are from the notch 30.

Figure 8:
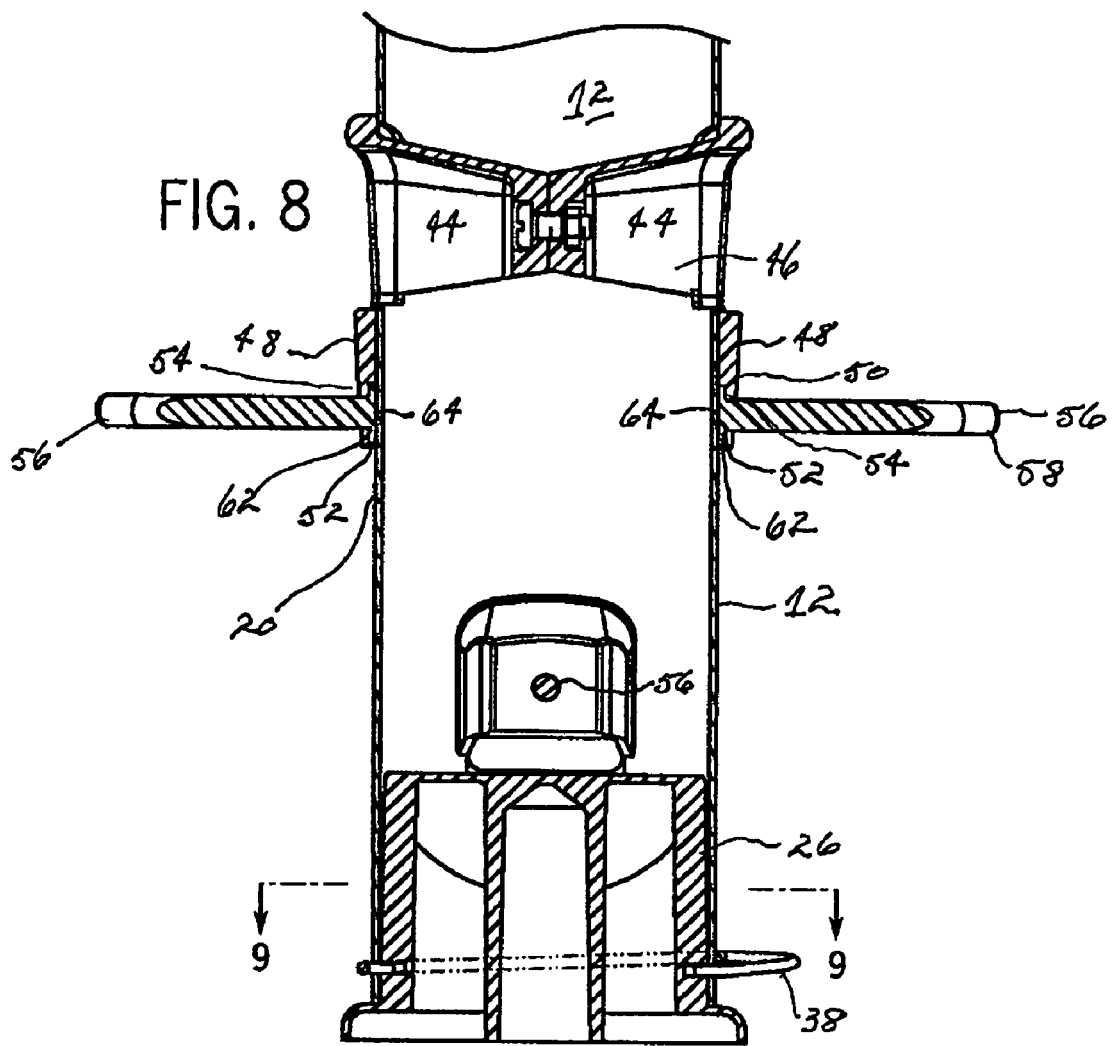
FIG. 8 is a cross-sectional view of the feeder along line 8-8 of FIG. 3.
Figure 9:
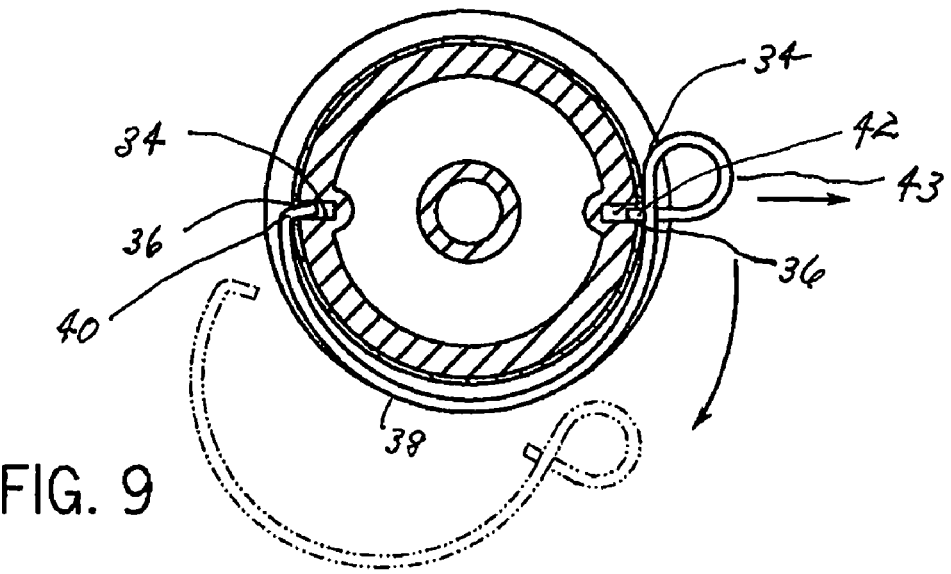
FIG. 9 is a cross-sectional view of the feeder along line 9-9 of FIG. 8, showing the spring clip as removed in phantom lines.
Figure 10:
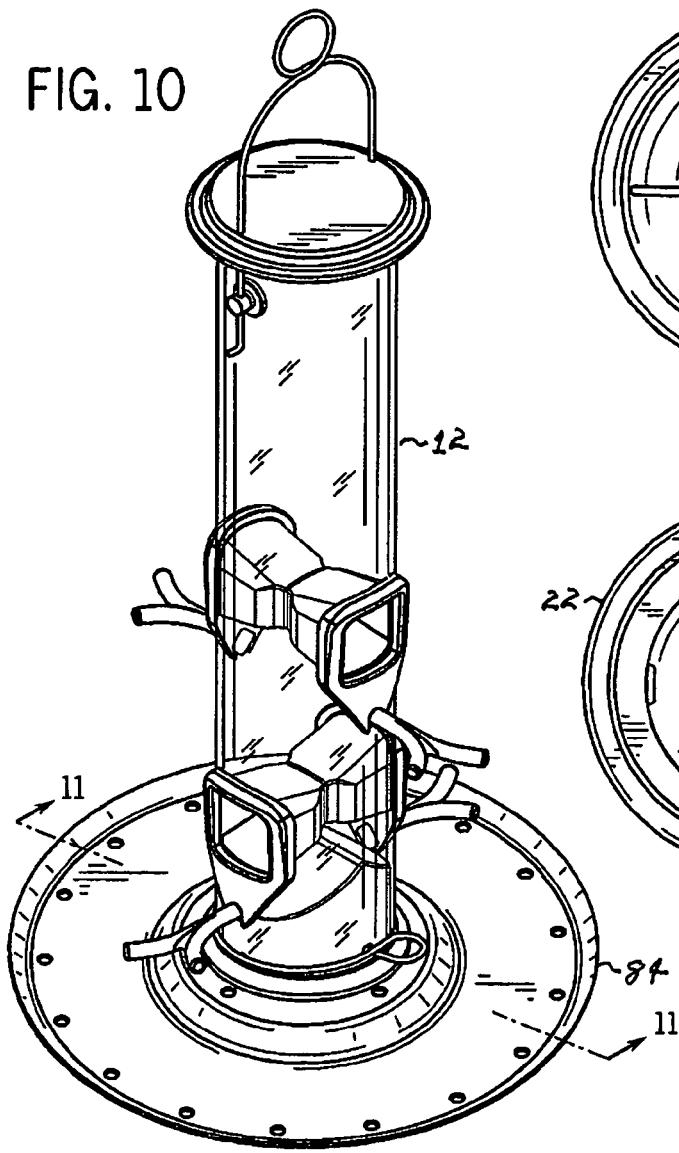
FIG. 10 is a perspective view of the feeder showing a seed catcher tray attached thereto.
Figure 12:
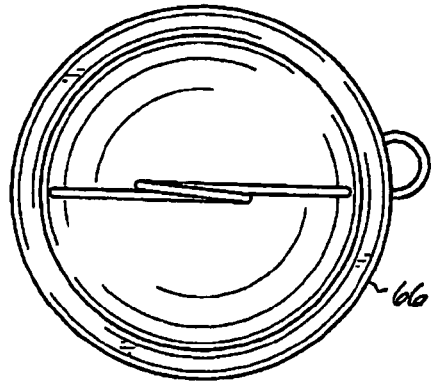
FIG. 12 is a top view of the feeder shown in FIG. 1.
Figure 13:
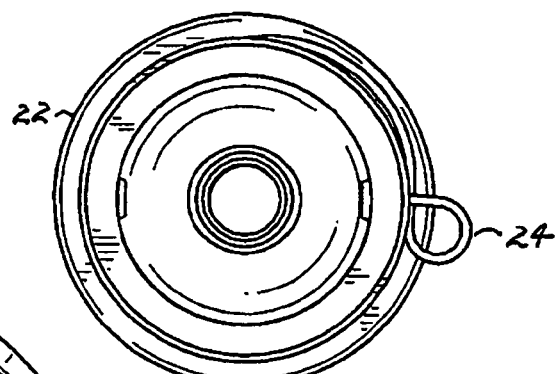
FIG. 13 is a bottom view of the feeder shown in FIG. 1.

As shown in FIGS. 2 and 8, the base cap 22 is attached to the body 12 by inserting the upper portion 26 into the interior 18 of the body 12 and mating the notch 30 on base cap 22 with the cutout notch 32 on the body 12 so that the bottom end 16 rests on the lip 29, whereby the two base holes 34 are aligned with the two body holes 36, resulting in two sets of aligned holes. As best illustrated in FIG. 9, a first end 40 of a spring clip 38 is then inserted into one set of an aligned base hole 34 and body hole 36 and a second end 42 is then inserted into the second set of an aligned base hole 34 and body hole 36. When both ends 40 and 42 are attached to the body 12 and base cap 22 in this manner, the spring force of the spring clip 38 locks the base cap 22 securely onto the body 12.

In a preferred embodiment of the tubular shaped feeder shown, the spring clip 38 is in a curved shape to generally conform to the curvature of the body 12, as shown in FIG. 9. However, the spring clip 38 can be configured differently to accommodate different feeder shapes as a method of attachment of a base cap 22 to a feeder body 12. Preferably, the first end 40 of the spring clip 38 is straight and angled inwardly for easier insertion into the body 12 and the base cap 22. The second end 42 of the spring clip 40 is preferably looped for grasping purposes and then angled inwardly for easier insertion into the body 12 and the base cap 22. However, other configurations of the spring clip 38 are possible and are intended to be included herein.

If it is desired that the base cap 22 be removed for cleaning or some other purpose, one can simply pull the loop 43 away from the feeder 10 on the second end 42 of the spring clip 38 to release the spring clip 38 and remove it at both the first end 40 and the second end 42 from both the base cap 22 and the body 12. The spring clip 38 is reattached most easily by aligning the notch 30 with the cutout notch 32 and the bottom end 16 of the body 12 with the lip 29 of the rim portion 28 of the base cap 22. The first end 40 of the spring clip 38 is then inserted into one aligned set of a body hole 36 and a base hole 34 and the second end 42 is inserted into the other aligned set of a body hole 36 and a base hole 34, while holding the loop 43 at the second end 42. In this manner, the base cap 12 can be readily removed from the body 12 and reattached efficiently and as desired without the use of tools. Furthermore, minimal strength is required to release or reaffix the spring clip 38. This novel attachment means is desirable for the birdwatcher, who may be refilling feeders or cleaning them outdoors, sometimes in inclement weather where tools may not be easily available or may be easily lost or misplaced under snow or vegetation.

As shown in FIGS. 1 and 2, the body 12 has a plurality of feeder ports 44. The feeder ports 44 are of generally conventional construction and are assembled and attached by screws or other means so they extend inwardly in the body 12 from opposite sides thereof, as shown in FIGS. 1 and 8. The feeder ports 44 are preferably of generally square or rectangular construction and can be made of die cast metal although other shapes, as well as materials, including plastic, are feasible. The port openings 46 are angled downwardly to permit the birds better access to the feed. Protective port rims 48, of larger dimension than the port openings 46 in the body 12 through which the feeder ports 44 extend, keep the feeder ports 44 in position on the body 12 and protect the body 12 from damage by birds or other animals. The protective port rims 48, in the preferred embodiment, are manufactured of die cast metal to enhance durability, although they could be manufactured of plastic or other materials.

As shown in FIG. 8, the protective port rims 48 are shaped to extend substantially below the port openings 46, each extended portion 50 having a vertical channel 52 extending upwardly for a short distance (approximately ¾") in the direction of the center of the port openings 46 with the protective port rims 48 snuggly fitted against the exterior 20 of the body 12. Additionally, the protective port rims 48 are configured with a generally square indentation 54 located on the side of each extended portion 50 facing the body 12 when the feeder 10 is assembled.

As shown in FIGS. 1 and 8, in a preferred embodiment, the perches 56 are configured of cast metal and, at a first end 58, resemble branches, having two perch arms 60 and a flat, generally square retention portion 62 at a second end 64, such retention portion 62 of a size and shape to fit into and mate with the indentation 54 in the protective port rim 48. Shapes other than square are feasible for mating the indentation 54 of the protective port rim 48 with the retention portion 62 of the perch 56. However, the generally square shape shown allows the rotation of the perches 56 as desired in 45° increments, and provides for the perches 56 to lock into place as the retention portion 62 is rotated 45° behind the protective port rims 48. The perches 56 can be configured in various ways at the first end 58, and could have more or less perch arms 60 and symmetrical or nonsymmetrical perch arms 60 as desired. The perches 56 could also be manufactured of plastic or other materials although they are manufactured of die cast metal in a preferred embodiment.

It should be understood that the retention portion 62 can be configured in various ways, but preferably mates with the indentation 54 in the protective port rims 48 to hold the perches 56 securely in place. The feeder ports 44 can vary in number, depending on the length of the body 12, and the desirability of more feeder ports 44 for feeding, but would generally be assembled in pairs in the configuration shown.

Figures 5, 6, 7:
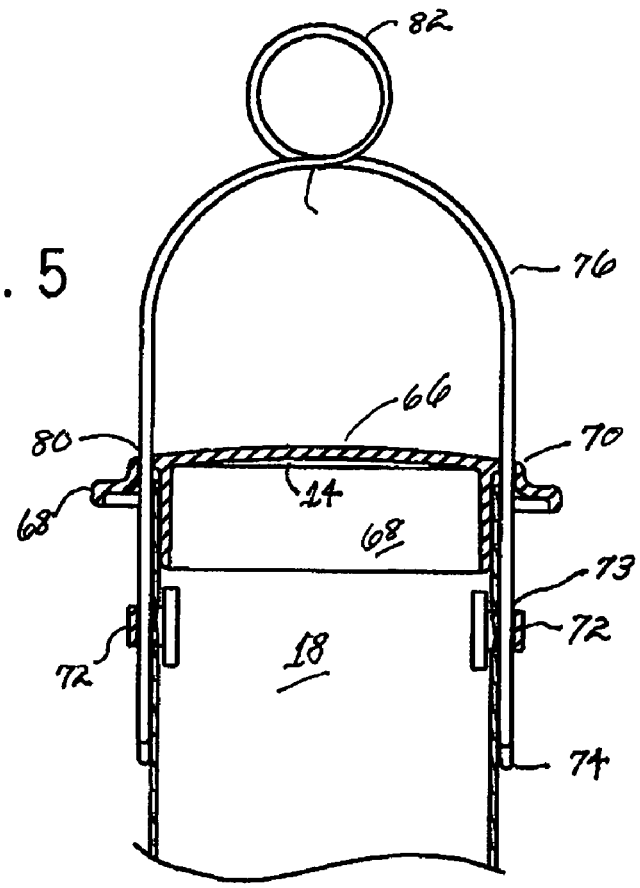
FIG. 5 is a partial cross-sectional view of the feeder along line 5-5 of FIG. 4.
FIG. 6 is a partial side elevational view of the feeder showing how the top cap lifts off of the body on the wire bail and also how it fits on the body of the feeder in phantom lines.
FIG. 7 is a partial side elevational view of the feeder showing the top cap rotated away from the top opening of the feeder on the wire bail after it is lifted up as shown in FIG. 6.

As is also seen in FIGS. 2, 5 and 6, the feeder 10 has a top cap 66, having an inside portion 68 and an outside portion 70 which, when in proper position on the body 12, covers the open top end 14 of the body 12. The inside portion 68 of the top cap 66 is of a diameter slightly smaller than the diameter of the tubular body 12 in the embodiment shown, so that the inside portion 68 can fit easily, but securely, within the interior 18 of the body 12. The outside portion 70 of the top cap 44 is of a greater diameter than the tubular body 12, so that the outside portion 70 overhangs the body 12 as shown in FIG. 5, thereby providing some protection to the feeder 10 and its contents from the elements, including sun and precipitation. In the preferred embodiment, the top cap 66 is made of die cast metal to enhance durability but it could be made of plastic or other materials.

Bail retention pins 72, as shown in FIGS. 1, 2, 3 and 5, are affixed to the body 12 on opposite sides thereof, preferably, but not necessarily, about 1-1¼" away from the top end 14 thereof. Each of the bail retention pins 72 have vertical holes 73 therethrough to accept the end 74 of a wire bail 76. The use of bail retention pins 72 instead of other common methods to retain the bail (such as a bar connection across the interior diameter of the body 12), is a substantial improvement since bird seed has a tendency to bounce and spill if it has contact with an object near the top end 14 of the body 12 while being poured into the body 12 during filling. By incorporating bail retention pins 72 which only slightly extend into the interior 18 of the body 12 (see FIG. 5), filling of the feeder 10 is easier and less likely to result in spillage and waste of feed.

In a preferred embodiment, the top cap 66 is connected to the body 12 by means of a wire bail 76. One of the two wire bail ends 74 passes through one of the top cap openings 80 in the outside portion 68 of the top cap 66 and then passes through the vertical hole 73 of the bail retention pin 72 on the same side of the body 12, as the second of wire bail ends 74 passes through the second top cap opening 80 in the outside portion 68 of the top cap 66 and then through the vertical hole 73 of the bail retention pin 72 on the opposite side of the body 12. In a preferred embodiment, each of the wire bail ends 74 is curved at a sufficient angle from vertical (preferably 45°-90°), to allow the rotation of the wire bail 76 to either side of the body 12 (rotation to one side is shown in FIG. 7), while retaining attachment of the wire bail 76 and the top cap 66 through the bail retention pins 72. In a preferred embodiment, the wire bail 76 is also looped in the center 82 thereof to provide for more stable hanging on a hook if desired, as well as to provide easy grasping means. However, other configurations of the wire bail 76, including other grasping means, are possible and intended to be included herein.

When it is desired to open the top cap 66 of the feeder 10, the wire bail 76 is pulled up vertically as shown in FIG. 6. The top cap 66 is then lifted vertically up the wire bail 76 until the inside portion 68 is above the top end 14 of the body 12. The wire bail 76 can then be rotated in either direction away from the top end 14 of the body 12, thereby rotating the top cap 66 away from the top end 14 of the body 12, to provide clear access to the interior 18 of the body 12 for filling or cleaning.

A particular advantage of this method of attachment of the top cap 66 is that the top cap 66 causes no obstruction to the filling or cleaning of the body 12. Additionally, the top cap 66 can be lifted and rotated away from the top end 14 quickly and without the use of tools. Furthermore, the top cap 66 stays attached to the feeder 10 by means of the wire bail 76 so that the top cap 66 will not fall off or get lost during filling or cleaning. Since the most critical season for feeding birds is during the winter months, this method of attachment makes it unlikely that the top cap 66 will get lost in snow.

When it is desired to use the feeder 10 after filling or cleaning of the body 12, the wire bail 76 is rotated to its vertical position and the top cap 66 is then dropped into its original position covering the top end 14 of the body 12, with the inside portion 68 of the top cap 66 seated in the body interior 18. The feeder 12 can then be rehung on a tree or pole for further use.

Figure 11:
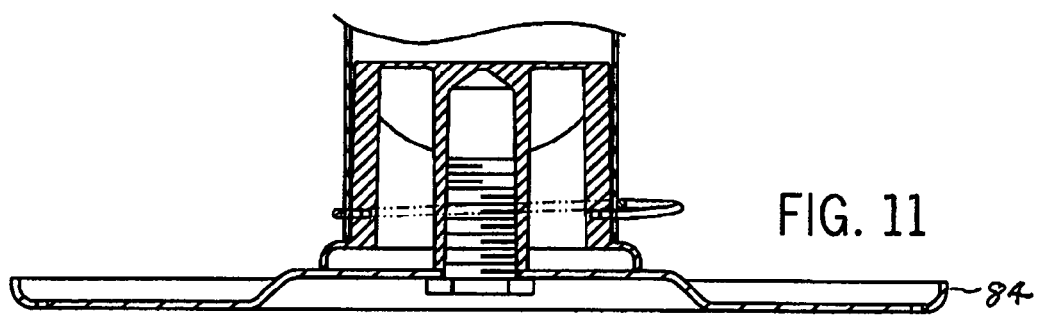
FIG. 11 is a cross-sectional view of a bottom portion of the feeder along line 11-11 of FIG. 10.

Another preferred embodiment includes a seed catcher tray 84, as shown in FIGS. 10, 11, 14 and 15, which readily attaches to the bottom of the base cap 22 by a screw device as shown in FIG. 11, or alternative attachment means.

Figure 18:
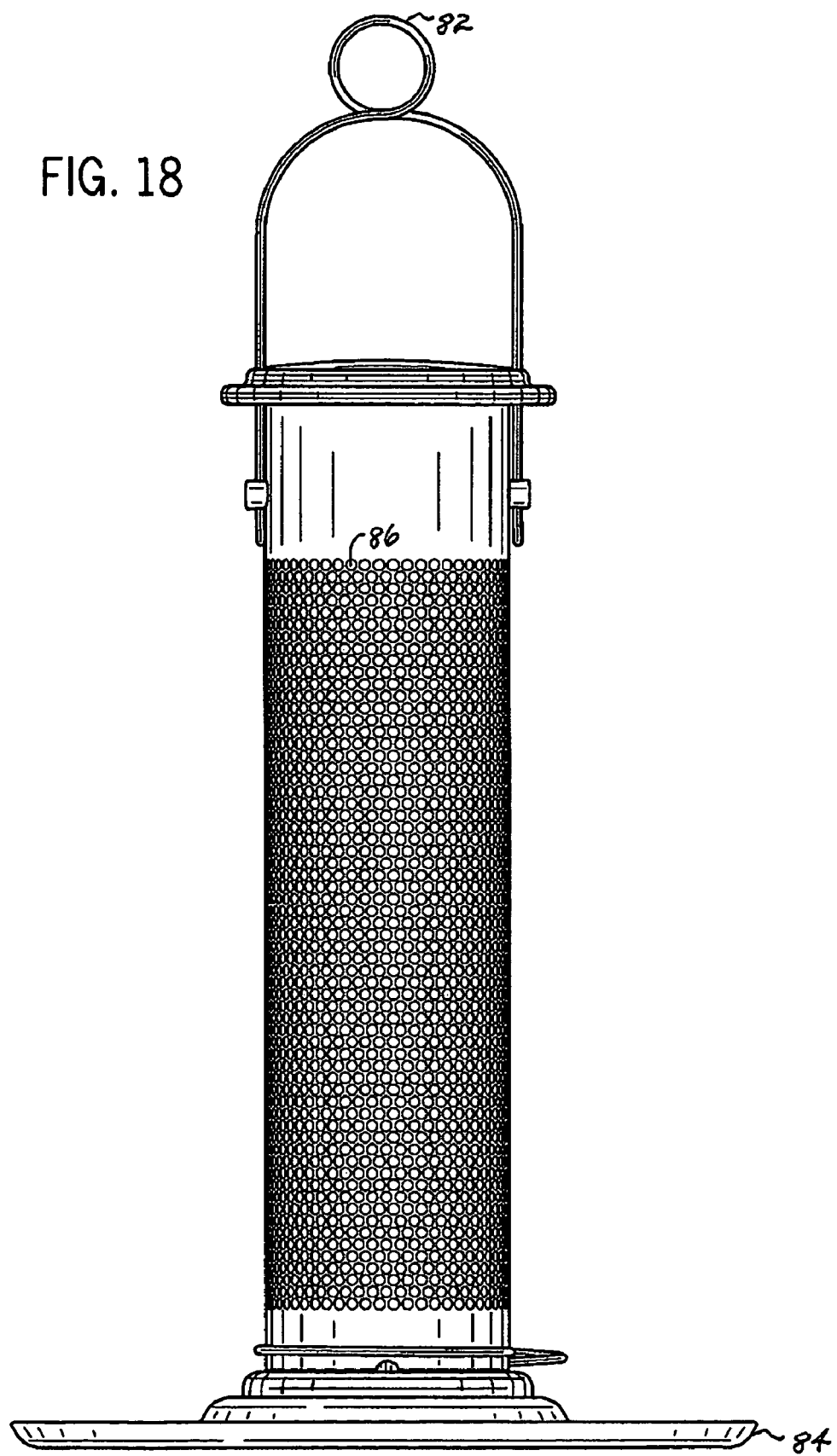
FIG. 18 is an elevational view of a bird feeder having a body of perforated metal with small holes and the tray shown in FIG. 14 attached thereto.

As shown in FIGS. 16, 17 and 18, another preferred embodiment of the invention provides a body 12 made of perforated or expanded stainless steel or other metal welded together in a tubular shape and open at either end as previously described. The feed holes 86 can be stamped out of the metal before assembly in various sizes to accommodate the size of the seed desired. Since ordinarily one type of food of consistent size would be used in a single feeder, the feed holes 86 are preferably uniform in size on any one feeder 10. The large holed feeder 10 shown in FIG. 16 would be most suitable for food such as peanuts. The mid-sized holed feeder shown in FIG. 17 would be most suitable for sunflower seeds or similar seeds, and the small holed feeder would be most suitable for thistle. Although three hole sizes are discussed herein, other feed hole 86 sizes are also feasible, as desired. The size of the feed holes 86 should be small enough to retain the feed in the feeder 10 if not being actively pulled through the holes by a bird in the process of feeding, but should be large enough so that the feed may easily pass through the feed holes 86 if birds are actively feeding.

Where a metal body is used, the perches 56 and feeder ports 44 are not incorporated in the feeder 10 since the feed is pulled through the feed holes 86. Furthermore, the birds can use the feed holes 86 as a gripping surface. The top cap 66, the wire bail 76, the base cap 22, the spring clip 38 attachment and their interrelationship to one another would preferably have the same configuration in these metal body feeders 10 as previously discussed. Additionally, a seed catcher tray 84 could be attached to the metal body feeders 10 in the same manner as in the previous embodiments, as shown in FIG. 18. The seed catcher tray 84 is preferably made of die cast metal, although other materials, including plastic, are intended to be included herein.

The use of stainless steel in the manufacture of the body 12 increases the durability of the feeder 10 and decreases cost of manufacture. It also makes the feeder 10 much easier to clean and fill since, particularly in the metal body 12 construction described, the interior 18 of the body 12 is generally open and unobstructed when the top cap 66 is removed from its position on the body 12 and the wire bail 76 is rotated away.

In general, while the present invention has been described in terms of preferred embodiments, it is recognized that equivalents, alternatives, and modifications, aside from those expressly stated, are possible and within the scope of the appending claims.

What is claimed is:

1. A method for attaching a base cap to a bird feeder, the method comprising the steps of:
   a) providing a bird feeder having a body, the body having an inside, an outside, a bottom end, a cutout notch and two body holes on opposite sides of the body, wherein the cutout notch and the body holes are on the bottom end of the body;
   b) providing a base cap having an upper portion, a rim portion, a notch and two base holes on opposite sides of the upper portion, wherein the upper portion is configured to fit inside the bottom end of the body and the base holes are positioned to align with the body holes when the upper portion of the base cap is inside the bottom end of the body;
   c) Providing a spring clip having a first end and a second end;
   d) Aligning the notch on the base cap with the cutout notch on the body, whereby the two base holes align with the two body holes, forming two sets of aligned holes;
   e) Inserting the first end of the spring clip into one set of aligned holes;
   f) Inserting the second end of the spring clip into the second set of aligned holes, whereby the base cap and the body are held together only by spring forces.

2. The method of claim 1, further providing that the rim portion has a lip extending beyond the body, whereby the bottom end of the body rests on the lip when the notch and the cutout notch are aligned, thereby providing sufficient closure of the bottom end of the body to prevent the contents in the body from escaping.

3. The method of claim 1 wherein the spring clip has a loop at the second end to provide grasping means.

* * * * *